(12) United States Patent
Drzyzga et al.

(10) Patent No.: US 9,256,868 B2
(45) Date of Patent: *Feb. 9, 2016

(54) SWITCHING FUNCTIONS FOR MOBILE PAYMENTS SYSTEM

(71) Applicant: MasterCard International Incorporated, Purchase, NY (US)

(72) Inventors: Krzysztof Michal Drzyzga, Warsaw (PL); Brian Thomas Morris, Brussels (BE)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,835

(22) Filed: Jul. 17, 2014

(65) Prior Publication Data

US 2014/0330711 A1 Nov. 6, 2014

Related U.S. Application Data

(63) Continuation of application No. 14/028,804, filed on Sep. 17, 2013, now Pat. No. 8,792,861, which is a continuation of application No. 12/566,065, filed on Sep. 24, 2009, now Pat. No. 8,559,923.

(60) Provisional application No. 61/179,200, filed on May 18, 2009.

(51) Int. Cl.
*H04W 72/08* (2009.01)
*G06Q 20/32* (2012.01)
*G06Q 20/40* (2012.01)
*G06Q 20/10* (2012.01)
*G06Q 20/34* (2012.01)
*G06Q 20/42* (2012.01)

(52) U.S. Cl.
CPC ............ *G06Q 20/322* (2013.01); *G06Q 20/102* (2013.01); *G06Q 20/32* (2013.01); *G06Q 20/351* (2013.01); *G06Q 20/40* (2013.01); *G06Q 20/4012* (2013.01); *G06Q 20/4018* (2013.01); *G06Q 20/42* (2013.01)

(58) Field of Classification Search
CPC ......... H04M 3/16; H04W 12/06; H04W 4/00; H04W 4/02
See application file for complete search history.

(56) References Cited

U.S. PATENT DOCUMENTS 8,559,923 B2 * 10/2013 Drzyzga et al. ............... 455/410
8,792,861 B2 * 7/2014 Drzyzga et al. ............... 455/410

* cited by examiner

*Primary Examiner* — Diane Mizrahi
(74) *Attorney, Agent, or Firm* — Buckley, Maschoff & Talwalkar LLC

(57) ABSTRACT

A data processing center (DPC) computer receives billing information, including a mobile telephone number, and a bill issuance notification request from an acquirer computer. The DPC computer then determines, based on the mobile telephone number, a mobile payment platform (MPP) computer having an account holder as a customer, transmits the billing information to the MPP computer for relaying a billing issuance notification to a mobile device of the account holder, and then receives information indicating that the account holder has been authenticated and has elected to pay the bill associated with the billing issuance notification. The DPC computer then determines a payment card account number of the account holder, and transmits it to the acquirer computer for bill payment processing.

8 Claims, 11 Drawing Sheets

SWITCHING FUNCTIONS FOR MOBILE PAYMENTS SYSTEM

CROSS-REFERENCE TO RELATED APPLICATIONS

This application is a continuation of U.S. application Ser. No. 14/028,804 filed on Sep. 17, 2013, which claims the benefit of U.S. application Ser. No. 12/566,065 filed on Sep. 24, 2009, now U.S. Pat. No. 8,559,923 and which claims the benefit of U.S. Provisional Patent Application No. 61/179,200, filed May 18, 2009, which applications are incorporated herein by reference in their entirety.

BACKGROUND

Embodiments disclosed herein relate to payment systems. In particular, some embodiments relate to methods, apparatus, systems, means and computer program products for implementing a mobile payment system on the basis of a payment card system.

Payment card systems are in widespread use. A prominent payment card system is operated by the assignee hereof, MasterCard International Incorporated, and by its member financial institutions. There have been proposals to permit access to payment card systems via an account holder's mobile telephone. Some embodiments of such a mobile payments system are described in prior and commonly-assigned U.S. patent application Ser. No. 12/323,016, filed Nov. 25, 2008.

The present inventors now disclose embodiments of a mobile payments system that facilitates participation by a number of mobile payment platform service providers.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a mobile payments system uses a payment card system as a backbone. Several mobile payment platform service providers (hereinafter sometimes referred to as MPPs) participate in the mobile payments system. Users of the system are each enrolled with one of the mobile payment platform service providers. The mobile payment platform service providers handle authentication and user confirmation of approval for each transaction by challenging the user via the user's mobile telephone to enter a mobile PIN (personal identification number) and verifying that the user has entered the PIN correctly.

Another participant in the mobile payments system is a data processing center which also provides switching functions among acquiring financial institutions and mobile payment platform service providers. For example, when a mobile payment transaction enters the system via an acquirer, the acquirer sends a message to the data processing center/switching platform, which in turn requests that the purchaser's MPP obtain approval from and authenticate the purchaser via the purchaser's mobile telephone. The data processing center/switching platform also translates the purchaser's mobile telephone number into the purchaser's payment card account number and provides the account number and related information to the acquirer.

Further, when a transaction comes into the system via a request from a purchaser's mobile telephone, the purchaser's MPP may send a message to the data processing center/switching platform to request that the data processing center/switching platform identify and switch the transaction to the acquiring FI for a merchant that is specified in the purchaser's request.

(As is well known, the acquirer FI is the organization that transmits a purchase transaction to a payment card system for routing to the issuer of the payment card account in question. Typically, the acquirer FI has an agreement with merchants, wherein the acquirer FI receives authorization requests for purchase transactions from the merchants, and routes the authorization requests to the issuers of the payment cards to be used for the purchase transactions. In some cases, the acquirer FI may contract out transaction handling services to a third party service provider. As used in this disclosure and the appended claims, "acquirer FI" includes both such FIs and third party service providers under contract to such FIs. The terms "acquirer", "acquirer FI" and "acquiring FI" will be used interchangeably herein. The terms "issuer", "issuer FI" and "issuing FI" will also be used interchangeably herein to refer to the FI that issued a payment card account to an account/card holder.)

Figure 1:
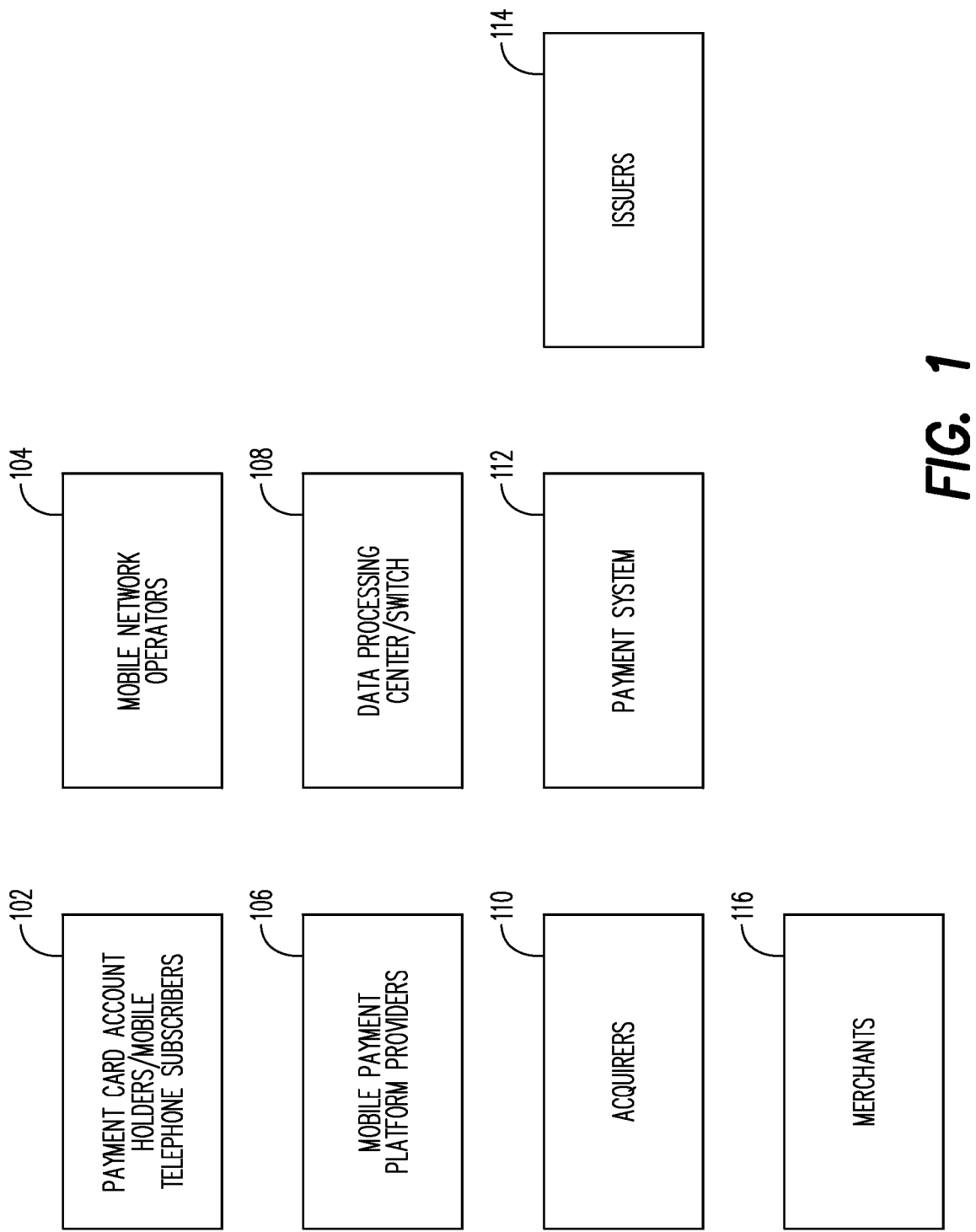
FIG. 1 is a block diagram that illustrates a roster of participants in a mobile payments system provided in accordance with aspects of the present invention.

FIG. 1 is a block diagram that illustrates a roster of participants in a mobile payments system 100 provided in accordance with aspects of the present invention. Block 102 in FIG.

1 represents individual users of the mobile payments system 100. Users 102 hold payment card accounts and are subscribers to mobile telephone services provided by mobile network operators (MNOs) 104. The users 102 will henceforth most frequently be referred to as "account holders". Each account holder 102 has become a participant in the mobile payments system 100 by enrolling with one of the mobile payment platform service providers (MPPs) indicated by block 106.

Another participant in the mobile payments system 100 is the above-mentioned data processing center/switching platform, indicated by block 108. In addition, the mobile payments system 100 includes acquiring FIs 110.

The mobile payments system 100 also includes a payment system 112 and payment card account issuers 114.

The payment system 112 may operate in a conventional manner. An example of a suitable payment system is the "Banknet" system operated by MasterCard International Inc., the assignee hereof. As is well-known by those who are skilled in the art, the payment system 112 routes purchase transaction authorization requests from acquirers 110 to issuers 114, and routes purchase transaction authorization responses back from the issuers 114 to the acquirers 110. A separate system for clearing purchase transactions may also be provided by the operator of the payment system 112 but is not indicated herein in the interests of simplifying the drawing.

The issuers 114 are financial institutions that issue the payment card accounts held by the account holders 102. The issuers 114 may operate in a conventional manner to receive authorization requests via the payment system 112 and to transmit authorization responses back to acquirers via the payment system 112.

From previous discussion, it will be appreciated that merchants, represented by block 116, have relationships with acquirers 110, which submit transactions to the payment system 112 on behalf of the merchants 116.

Each of the blocks shown in FIG. 1 may also be considered to represent one or more computers operated by or on behalf of the respective participant to perform the participant's functions in the mobile payments system 100, as described herein (except that the account holders 102 will be understood as not necessarily operating computers, but as users of mobile telephones that are employed to access services provided in the mobile payments system 100). Each of the computers may have a hardware architecture in accordance with the block diagrams presented herein as FIGS. 2-4.

In some embodiments, account holders 102 may participate in the mobile payments system 100 based on payment card accounts (e.g., debit or credit card accounts) issued to them by issuers 114. In addition or alternatively, in some embodiments the issuers issue only virtual payment card accounts to account holders for use in the mobile payments system 100. For a virtual payment card account, the issuer 114 may refrain from issuing a payment card or other physical storage medium for the payment card account number to the account holder 102. The payment card account number and the expiration date for the virtual payment card account may be known to the account holder 102, but in some embodiments the issuer 114 may not disclose a security code such as a CVC2 to the account holder 102.

The issuer 114 may use a secure data communication channel or other secure data transfer mechanism (e.g., secure shipment or courier delivery of data storage media) to provide data concerning the account holder 102 to the data processing center/switching platform 108. Such data may include the account holder's mobile telephone number, and payment card account number, as well as the expiration date and security code for the payment card account. The data processing center/switching platform 108 then creates a data record for the account holder 102.

A remote payments application program may be stored on the account holder's mobile telephone (not shown in FIG. 1) to allow the account holder 102 to participate in the mobile payments system 100 via his/her mobile telephone. There may be various GSM technologies to be used to enable customers to use mobile payments, i.e., SIM toolkit, Java, USSD and others.

The account holder 102 may be required to correctly enter a mobile PIN (M-PIN) in order to access the remote payments application. The remote payments application may, for example, have been loaded into the SIM card of the account holder's mobile telephone by or on behalf of the MNO 104 which provides mobile telephone service to the account holder 102. (In some embodiments, the remote payments application may have been supplied to the MNO by an MPP.) For example, in the process of supplying the SIM card to the MNO 104, the supplier of the SIM card may install the remote payments application in the SIM card. Alternatively, if the SIM card has already been installed in the account holder's mobile telephone, the MNO 104 (or an MPP 106) may download the remote payments application to the SIM card via an OTA (over the air) data communication session between the account holder's mobile telephone and a computer operated by or on behalf of the MNO 104 (or the MPP 106).

In some embodiments, the account holder may enter his/her M-PIN to activate the remote payments application on his/her mobile telephone, and may then interact with one of the MPPs 106 to enroll as a participant in the mobile payments system 100. For this purpose, the MPP 106 may store a data record for the account holder 102, including the account holder's M-PIN and mobile telephone number. Communications between the MPP 106 and the remote payments application may be encrypted to prevent the account holder's M-PIN from being compromised.

Once the account holder 102 has enrolled with an MPP 106, the MPP 106 may inform the data processing center/switching platform 108 of the enrollment of the account holder 102. As a result, the data processing center/switching platform 108 may update the data record for the account holder to associate the account holder's mobile telephone number with a code which identifies the particular MPP 106 with which the account holder 102 has enrolled.

In some embodiments, there may be three layers of encryption employed for transaction messaging between the account holder's mobile telephone and the account holder's MPP, with a goal of providing full end-to-end channel security. Within the mobile telephone, when the account holder enters his/her M-PIN it is sent directly to a remote payment application residing in the secure area of the SIM card in the mobile telephone. The M-PIN may be encrypted via a one-time password for the current transaction (e.g., in accordance with 3DES) and inserted in encrypted form into the transaction message. Further, the remote payment application may encrypt the entire transaction message utilizing a transaction key. Still further, the remote payment application may insert the transaction message (including the encrypted M-PIN, if required) into a properly formatted message (e.g. SMS), and then may encrypt the message according to the MNO's standards for transmission over the mobile telephone's radio link.

Upon receiving the message, the MNO radio base station may decrypt the message and route it to the MPP computer. The result of the decryption is a clear text header concatenated with the encrypted transaction message. The message is routed through the MNO's core network from the MNO base station to the MNO server (e.g., an SMS server). The MNO server switches the encrypted transaction message to the MPP computer.

At the MPP computer the transaction message may be decrypted and routed to the MPP service function. Then the M-PIN is decrypted and routed for verification.

In some embodiments, the triple level security may be reserved for higher value and/or higher risk transactions and some or all of the security steps may be omitted for lower value and/or lower risk transactions.

Figure 2:
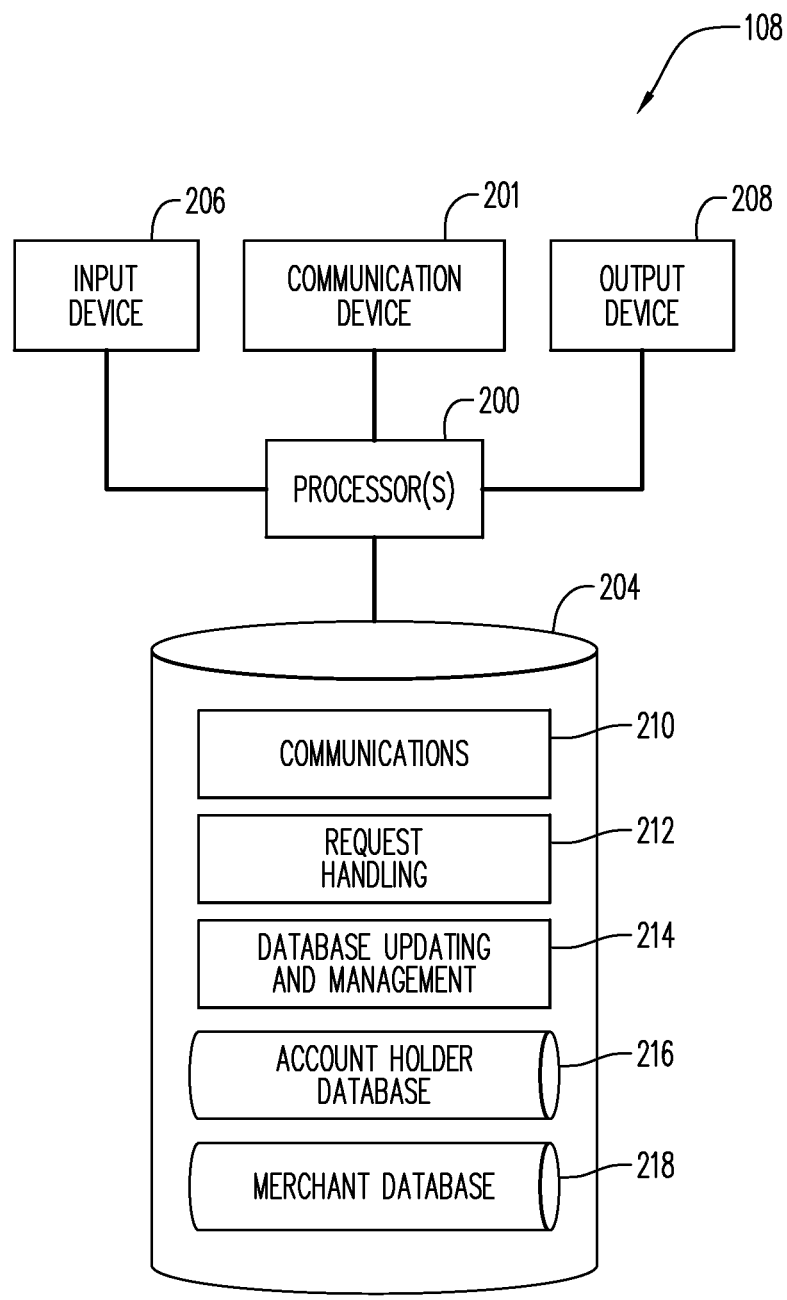
FIG. 2 is a block diagram of a computer that is operated by or on behalf of a data processing center/switching platform that is a part of the system of FIG. 1.

FIG. 2 is a block diagram of a computer 108 that is operated by or on behalf of the data processing center/switching platform.

The data processing center/switching platform computer 108 may be conventional in its hardware aspects but may be controlled by software to cause it to operate in accordance with aspects of the present invention.

The data processing center/switching platform computer 108 may include a computer processor 200 operatively coupled to a communication device 201, a storage device 204, an input device 206 and an output device 208.

The computer processor 200 may be constituted by one or more conventional processors. Processor 200 operates to execute processor-executable steps, contained in program instructions described below, so as to control the data processing center/switching platform computer 108 to provide desired functionality.

Communication device 201 may be used to facilitate communication with, for example, other devices such as computers operated by the MPPs 106 and the acquirers 110. Communication device 201 may, for example, have capabilities for engaging in data communication over conventional computer-to-computer data networks.

Input device 206 may comprise one or more of any type of peripheral device typically used to input data into a computer. For example, the input device 206 may include a keyboard and a mouse. Output device 208 may comprise, for example, a display and/or a printer.

Storage device 204 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of the listed storage devices may be referred to as a "memory" or a "storage medium" or a "computer usable medium".

Storage device 204 stores one or more programs for controlling processor 200. The programs comprise program instructions that contain processor-executable process steps of data processing center/switching platform computer 108, including, in some cases, process steps that constitute processes provided in accordance with principles of the present invention, as described in more detail below. The program instructions may also be referred to as "computer readable program code means".

The programs may include an application 210 that controls the data processing center/switching platform computer 108 for purposes of engaging in data communications with other computers, including computers referred to hereinabove.

The storage device 204 may also store an application 212 for controlling the data processing center/switching platform computer 108 to handle requests received from computers operated by MPPs and/or acquirers. Details of request handling provided by the data processing center/switching platform computer 108 in accordance with aspects of the present invention will be provided below.

Another application that may be stored by the storage device 204 is indicated by reference numeral 214 and is for managing databases that are referred to below. The application program 214 receives account holder and/or merchant information from MPPs and/or acquirers and updates the corresponding databases with the received information.

Reference numeral 216 in FIG. 2 identifies an account holder database maintained by the data processing center/switching platform computer 108 and stored on the storage device 204. For example, the account holder database may include, for each participating account holder, the account holder's name, mobile telephone number, payment card account number, payment card account expiration date, and payment card account security code (e.g., a CVC2). In addition, the entry in the database 216 for a given account holder may include data that indicates with which MPP the account holder is enrolled.

The storage device 204 may also store a merchant database 218. The merchant database 218 may include an entry for each merchant 116 that participates in the mobile payments system 100 (or at least for a subset of the merchants 116), and may indicate for each merchant 116 the identity of the merchant's acquiring FI 110.

The application programs of the data processing center/switching platform computer 108, as described above, may be combined in some embodiments, as convenient, into one, two or more application programs. Moreover, the storage device 204 may store other programs, such as one or more operating systems, device drivers, web hosting software, etc.

Figure 3:
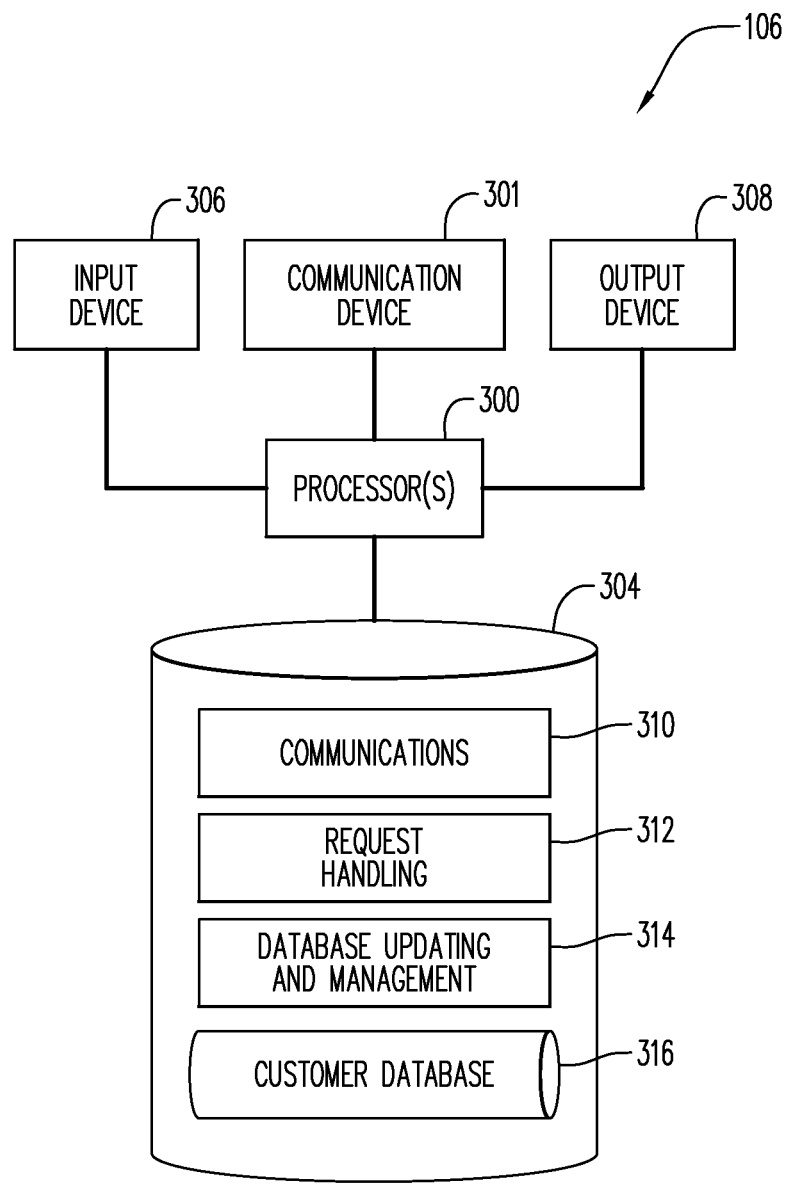
FIG. 3 is a block diagram of a computer that is operated by or on behalf of a mobile payment platform service provider/acquiring financial institution (FI) in the system of FIG. 1.

FIG. 3 is a block diagram of a computer that is operated by or on behalf of an MPP 106 in the mobile payments system 100.

The hardware architecture of the MPP computer 106 may be conventional and may be the same as that of the data processing center/switching platform computer 108. Thus, the above description of the hardware aspects of the data processing center/switching platform computer 108 is equally applicable to the hardware aspects of the MPP computer 106. Nevertheless, the following description is provided to summarize the hardware components of the MPP computer 106.

The MPP computer 106 may include a processor 300 that is in communication with a communication device 301, a storage device 304, an input device 306 and an output device 308. The storage device 304 may store an application program 310 that controls the MPP computer 106 for purposes of engaging in data communications with other computers, including computers referred to hereinabove such as the data processing center/switching platform computer 108.

Further, the storage device 304 may store an application program 312 which controls the MPP computer 106 to handle requests for transactions received from account holders via the account holders' mobile telephones and requests for account holder approval and authentication received from the data processing center/switching platform computer 108. Details of operation of the request handling application program will be described below.

Another application that may be stored by the storage device 304 is indicated by reference numeral 314 and is for managing a customer database that is discussed below. For example, the application program 314 may receive information from customers (account holders) who enroll for mobile payments services with the MPP which operates the MPP computer 106, and this information may be stored in a customer database 316 which is also stored by the storage device 304.

Moreover, the storage device 304 may store other programs, such as one or more operating systems, device drivers, web hosting software, etc. and may also store one or more other databases, such as a transaction database, which is not shown.

Figure 4:
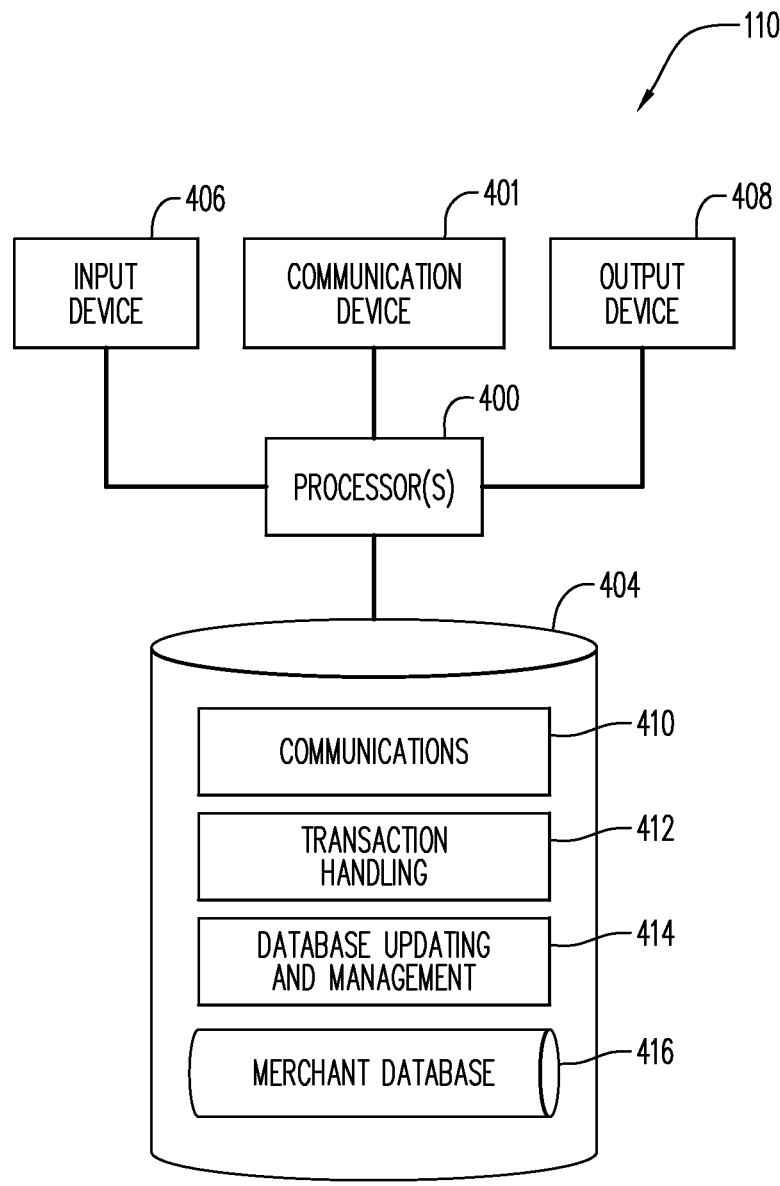
FIG. 4 is a block diagram of a computer that is operated by or on behalf of an acquiring financial institution in the system of FIG. 1.

FIG. 4 is a block diagram of a computer that is operated by or on behalf of an acquirer 110 in the mobile payments system 100.

The hardware architecture of the acquirer computer 110 may be conventional and may be the same as that of the data processing center/switching platform computer 108 and/or the MPP computer 106. Thus, the above description of the hardware aspects of the data processing center/switching platform computer 108 is equally applicable to the hardware aspects of the acquirer computer 110.

Nevertheless, the following description is provided to summarize the hardware components of the acquirer computer 110.

The acquirer computer 110 may include a processor 400 that is in communication with a communication device 401, a storage device 404, an input device 406 and an output device 408. The storage device 404 may store an application program 410 that controls the acquirer computer 110 for purposes of engaging in data communications with other computers, including computers referred to hereinabove such as the data processing center/switching platform computer 108 and one or more computers that are part of the payment system 112.

In addition, the storage device 404 may store an application program 412 which controls the acquirer computer 110 to handle transactions requested by merchants 116. In part, the acquirer computer 110 may handle transactions in a conventional manner with respect to payment system 112. In other respects, including aspects of transactions that require the acquirer computer 110 to interact with the data processing center/switching platform computer 108, the transaction handling application program 412 may function in accordance with aspects of the present invention and as described in further detail below.

Another application that may be stored by the storage device 404 is indicated by reference numeral 414 and is for managing a merchant database which is discussed below. For example, the application program 414 may receive information concerning merchants that enter into agreements under which the acquirer 110 is to serve as the merchants' contractor for submitting transactions to the payment system 112.

Also stored in the storage device 404 is a merchant database 416, in which the acquirer computer 110 stores information relating to the merchants 116 for which the acquirer computer 110 submits purchase transactions to the payment system 112.

Moreover, the storage device 404 may store other programs, such as one or more operating systems, device drivers, web hosting software, etc., and may also store one or more other databases, such as a transaction database, which is not shown.

Figure 5:
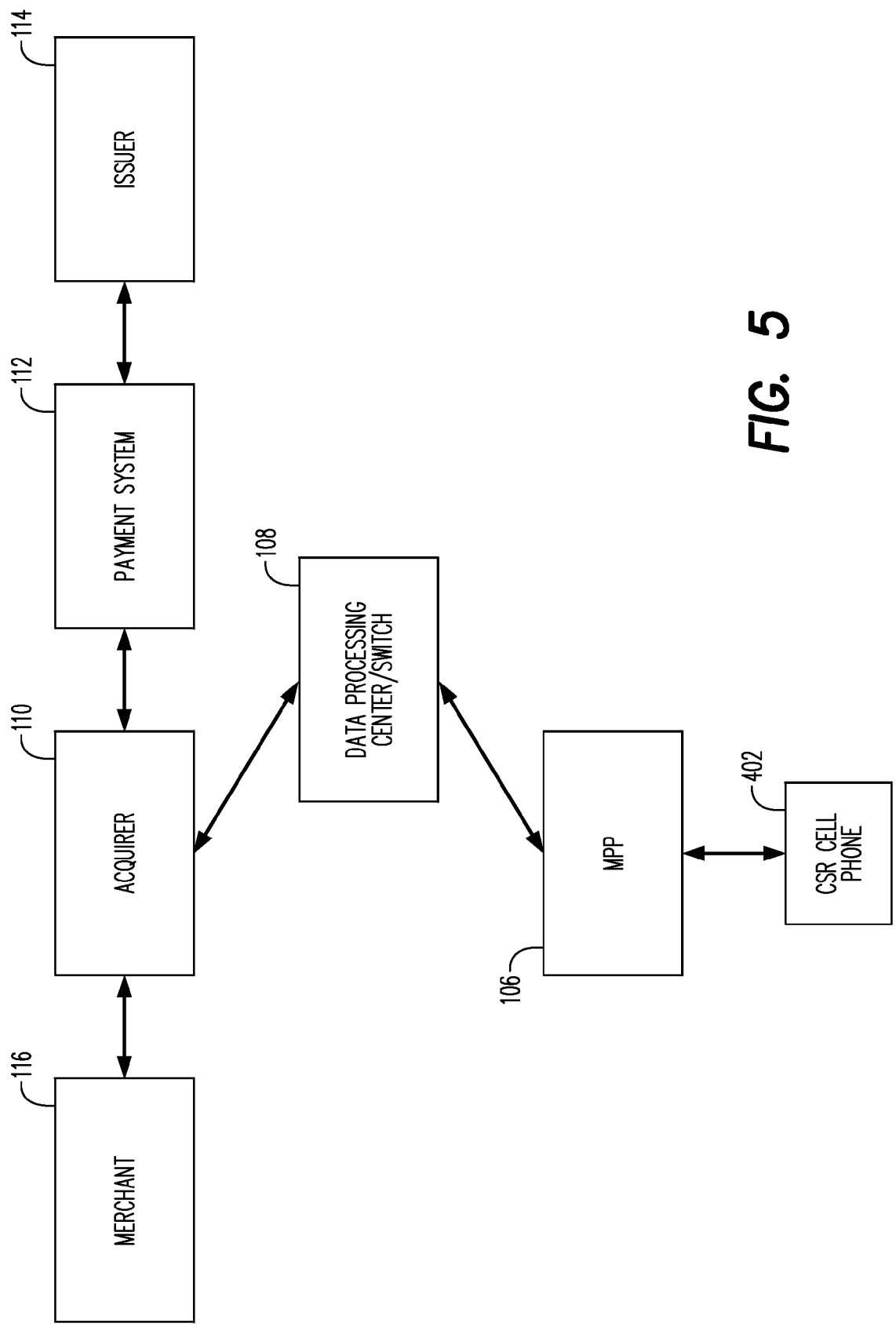
FIG. 5 is a block diagram that illustrates interactions among system participants in connection with a remote purchase transaction.

FIG. 5 is a block diagram that illustrates interactions among participants in the mobile payments system 100 in connection with a remote purchase transaction. A process for performing such a transaction will be described in some detail below in connection with FIG. 6, but first the participant interactions will be briefly described with reference to FIG. 5.

From the point of view of the mobile payments system 100, the purchase transaction may be initiated by a transaction request sent to an acquirer 110 from a merchant 116. In order to obtain the account holder's approval and also to obtain the account holder's payment card account number, the acquirer 110 sends a message to the data processing center/switching platform computer 108. The message from the acquirer 110 to the data processing center/switching platform computer 108 includes the account holder's mobile telephone number. In response to receiving the message, the data processing center/switching platform computer 108 contacts the account holder's MPP 106, which in turn interacts with the account holder's mobile telephone 402 to request the account holder to approve the transaction and to authenticate himself/herself by entering his/her mobile PIN. Assuming that approval and authentication duly take place, the account holder's MPP 106 sends a message to that effect to the data processing center/switching platform computer 108. The data processing center/switching platform computer 108 then translates the account holder's mobile telephone number into the account holder's payment card account number and transmits the account holder's payment card account number and other information to the acquirer 110. The acquirer 110 then uses the account holder's payment card account number to submit a purchase transaction authorization request to the account holder's payment card account issuer 114 via the payment system 112. The issuer's authorization response is routed to the acquirer 110 via the payment system 112, and if the authorization response indicates approval of the transaction, the acquirer 110 confirms to the merchant 116 that the transaction was successful. In addition, the acquirer requests the data processing center/switching platform computer 108 to forward confirmation of the transaction's success to the account holder's mobile telephone 402 via the account holder's MPP 106.

Figure 6:
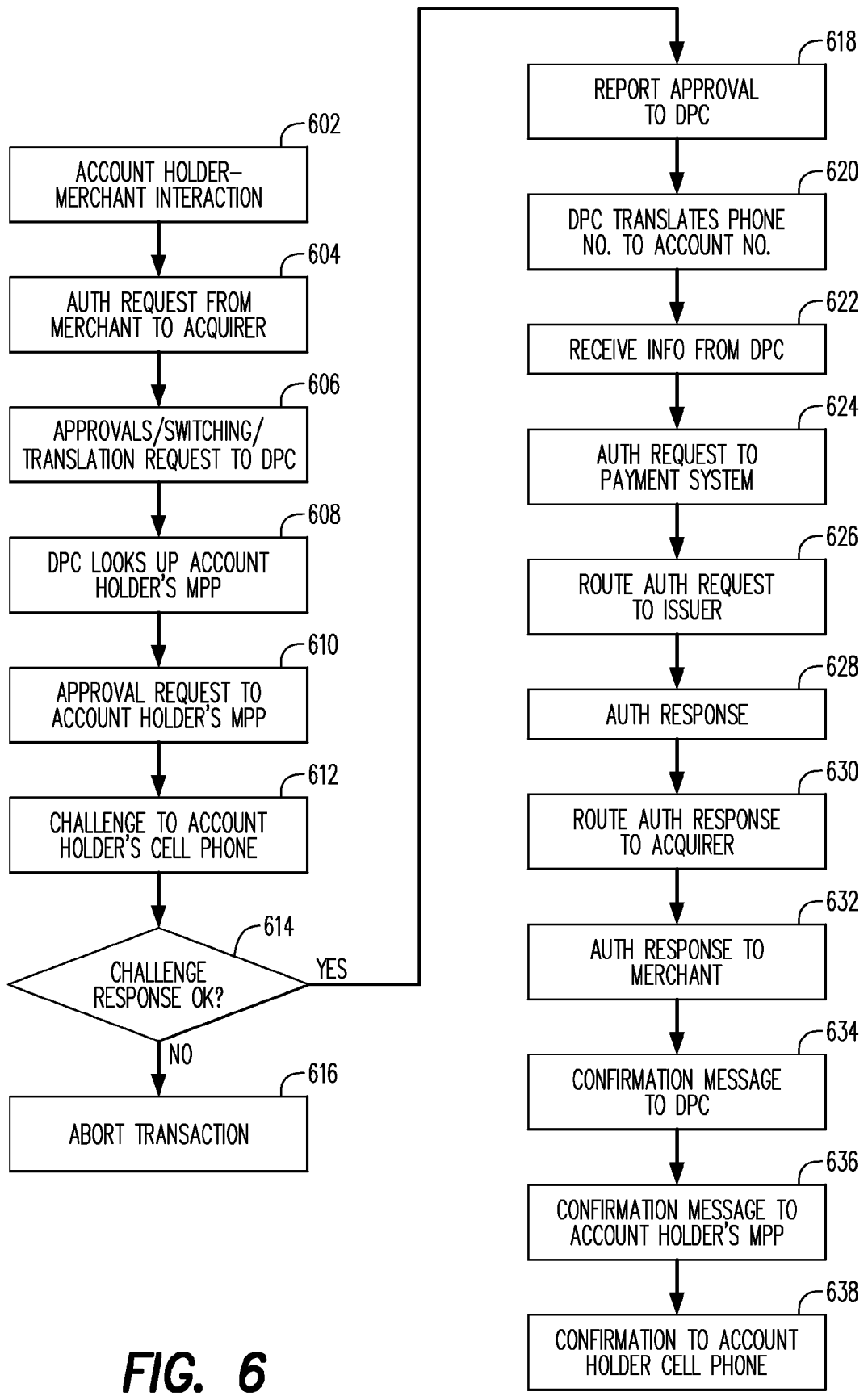
FIG. 6 is a flow chart that illustrates a process that may be performed in the system of FIG. 1 to implement a remote purchase transaction in accordance with aspects of the present invention.

FIG. 6 is a flow chart that illustrates a process that may be performed in the mobile payments system 100 in accordance with aspects of the present invention to implement the remote purchase transaction depicted in FIG. 5.

For purposes of this discussion, it is assumed that the account holder wishes to use the mobile payments system 100 to effect a purchase transaction via an e-commerce website. In this context, it will be understood that the e-commerce website may be operated by a merchant 116 that is a participant in the mobile payments system 100. The account holder 102 may use a personal computer (not shown), notebook computer (not shown) or web-enabled PDA or smart mobile telephone to interact with the merchant's e-commerce website. The interaction between the account holder 102 and the merchant's e-commerce website is represented by block 602 in FIG. 6. As part of the interaction, the account holder 102 may select one or more items for purchase from the website and then may elect to "check out". The website may total the proposed purchase transaction and present a number of payment options to the account holder 102, including a "mobile payments" option. (Other options may include, e.g., conventional credit or debit card payment, payment via a service like "Paypal", etc.) For present purposes it is assumed that the account holder 102 selects the "mobile payments" option. The website then prompts the account holder 102 to enter his/her mobile telephone number into the page presented on the website. It is assumed that the account holder 102 does so.

Next, at 604 in FIG. 6, the merchant 116 submits an authorization request for the proposed purchase transaction to the merchant's acquiring financial institution 110. This authorization request differs from a conventional payment card system authorization request in that it includes the purchaser's mobile telephone number rather than the purchaser's payment card account number. Thus, the acquirer needs to obtain the purchaser/account holder's payment card account number in order to introduce the authorization request into the payment system 112. In addition, approval of the transaction by the account holder and authentication of the account holder must be accomplished.

At 606 in FIG. 6, the acquirer computer 110 transmits, to the data processing center/switching platform computer 108 (and the data processing center/switching platform computer 108 receives), a request message to request that the data processing center/switching platform computer 108 switch the transaction to the account holder's MPP 106 to obtain the account holder's approval for the transaction. The request message also is for the purpose of requesting that the data processing center/switching platform computer 108 translate the account holder's mobile telephone number into the account holder's payment card account number. It will be understood that the request from the acquirer computer 110 to the data processing center/switching platform computer 108 includes the account holder's mobile telephone number. This request may be referred to as an information translation request.

At 608 in FIG. 6, and in response to receiving the request from the acquirer's computer, the data processing center/switching platform computer 108 uses the account holder's mobile telephone number to look up the relevant record in the account holder database 216 (FIG. 2) to determine which MPP in the mobile payments system 100 serves the account holder. At 610, the data processing center/switching platform computer 108 sends a request to the MPP computer 106 operated by or on behalf of the account holder's MPP to request that the account holder's approval be obtained for the transaction. This request may be referred to as a transaction acceptance request.

At 612, the MPP computer 106 operated by or on behalf of the account holder's MPP may issue a challenge to the account holder's mobile telephone 402. In some embodiments, the challenge may take the form of a text message sent by the MPP computer 106 to the account holder's mobile telephone 402. In other embodiments, the challenge may take the form of initiating a telephone call (e.g., by an automatic device such as an interactive voice response—IVR—unit associated with/incorporated in the MPP computer 106) to the account holder's mobile telephone 402.

Figure 7A:
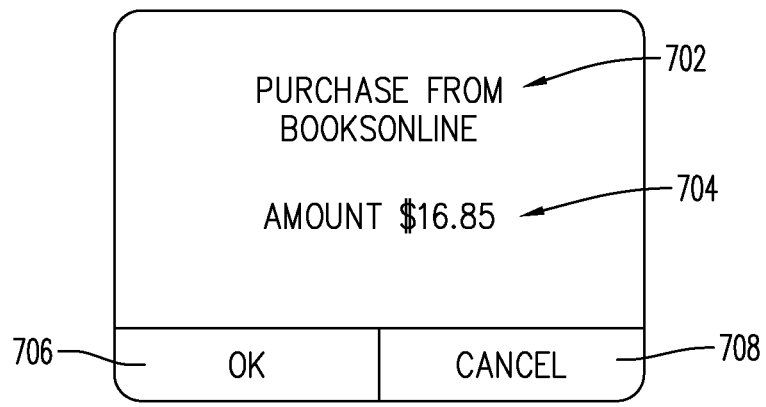
FIGS. 7A, 7B and 7C are example screen displays provided on a user's mobile telephone in connection with the remote purchase transaction depicted in FIGS. 5 and 6.

In some embodiments, the MPP computer 106 may interact with the payment application running in the account holder's mobile telephone 402 via OTA data communications such that the payment application causes the account holder's mobile telephone 402 to display information to implement the challenge. FIG. 7A is an example screen display that may be displayed by the account holder's mobile telephone 402 to indicate the challenge to the account holder. Referring to FIG. 7A, at 702 the screen display indicates to the account holder the merchant on whose behalf approval of the transaction is being requested. At 704, the amount of the transaction is indicated. Soft key label 706 indicates that the account holder is to actuate the left soft key (not shown) to indicate approval of the transaction. Soft key label 708 indicates that the account holder is to actuate the right soft key (not shown) to decline the transaction.

Figure 7B:
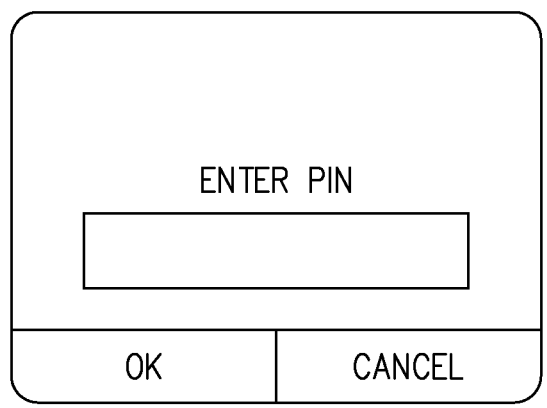

Assuming that the account holder indicates approval of the transaction, then the payment application may next cause the account holder's mobile telephone 402 to display the screen display shown in FIG. 7B. It will be recognized that the screen display shown in FIG. 7B prompts the account holder to enter his/her M-PIN. Upon the account holder having done so, the payment application may cause the account holder's mobile telephone 402 to transmit an indication of approval of the transaction and the entered M-PIN to the MPP computer 106.

(In some embodiments, a mobile device other than a mobile telephone may participate in the challenge and response functions described herein. For example, the challenge may alternatively be issued to a PDA (personal digital assistant) with mobile communication capabilities that is registered to the account holder in question. For example, the challenge may take the form of an electronic mail message to the mobile device. In other embodiments, the challenge and response may be performed in a mobile messaging session between the mobile device/telephone and the MPP computer 106. The mobile device/telephone may have been programmed with a suitable application program to support receiving and responding to challenges from the MPP computer 106.)

In some embodiments, the challenge prompts the account holder to enter a mobile PIN (M-PIN) into the account holder's mobile telephone 402 and to transmit the M-PIN (e.g., via a text message, or via keypad entry in response to a query from an IVR unit, etc.) to the MPP computer 106. (In a preferred embodiment, the M-PIN must be manually entered into the account holder's mobile telephone 402 by the account holder in response to the challenge, and is not stored in the mobile telephone. In some embodiments, the M-PIN may be encrypted by the account holder's mobile telephone 402 before it is transmitted to the MPP computer 106. In some embodiments, the account holder may have the option of declining the transaction instead of entering the M-PIN in response to the challenge.)

A decision block 614 follows block 612. At decision block 614, the MPP computer 106 operated by or on behalf of the account holder's MPP determines whether the account holder has responded to the challenge in a timely manner by correctly inputting his/her M-PIN. If not, then the MPP computer 106 operated by or on behalf of the account holder's MPP may abort the transaction, as indicated at 616. To do so, the MPP computer 106 operated by or on behalf of the account holder's MPP may send a suitable message to the data processing center/switching platform computer 108. The data processing center/switching platform computer 108, in turn, may send a message to the acquirer computer 110 to indicate that transaction approval and/or account holder authentication failed. The acquirer computer 110 may then provide a negative authorization response to the merchant 116. The merchant 116 in turn, by its website, may notify the account holder that authorization of the transaction did not occur.

Figure 7C:
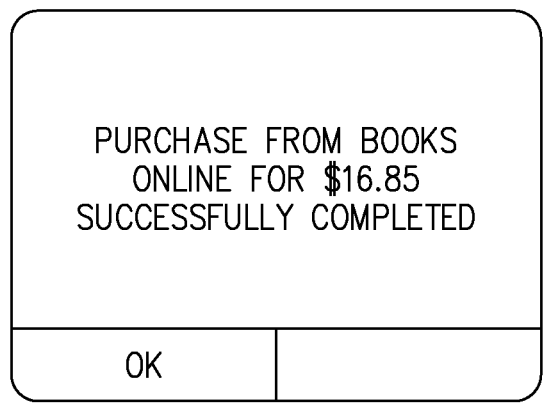

In cases where the MPP computer 106 operated by or on behalf of the account holder's MPP determines that the account holder timely inputted his/her M-PIN, then block 618 follows decision block 614. At block 618, the MPP computer 106 operated by or on behalf of the account holder's MPP sends a message to the data processing center/switching platform computer 108 to indicate that the account holder approved the transaction and was authenticated. Then, at 620, the data processing center/switching platform computer 108 receives the message from the MPP computer 106 and responds to receiving the message by accessing the account holder database 216 (FIG. 2) and using the account holder's mobile telephone number to determine the account holder's payment card account number, which the data processing center/switching platform computer 108 transmits in a message to the acquirer computer 110. Block 622 in FIG. 7 represents the acquirer computer 110 receiving the account holder's payment card account number from the data processing center/switching platform computer 108 (which transmitted the payment card account number to the acquirer's computer). The same message from the data processing center/switching platform computer 108 to the acquirer computer 110 also implicitly or explicitly indicates to the acquirer computer 110 that account holder approval and authentication have occurred. The acquirer computer 110 may also receive from the data processing center/switching platform computer 108 (and the data processing center/switching platform computer 108 may send to the acquirer computer 110) certain additional information. The additional information may include, for example, a security code (e.g., a CVC2) for the account holder's payment card account and the expiration date for the account holder's payment card account The information may also include the account holder's name. (This information may also have been stored in the account holder database 216 in the data processing center/switching platform computer 108 in association with the account holder's mobile telephone number. The data processing center/switching platform computer 108 may have looked up the additional information at the same time it translated the account holder's mobile telephone number into the account holder's payment card account number.) Accordingly, the acquirer computer 110 now has all the information it needs to generate a conventional payment card system transaction authorization request.

Block 624 in FIG. 6 represents the acquirer computer 110 generating the transaction authorization request and transmitting the authorization request to the payment system 112 (FIG. 5). At 626, the payment system 112 routes the authorization request in a conventional manner to the issuer 114 of the account holder's payment card account. At 628, the issuer 114 generates an authorization response in a conventional manner to indicate whether the transaction is authorized. For example, the issuer 114 may determine whether the payment card account indicated by the payment card account number included in the authorization request is in good standing and has sufficient funds or available credit to cover the requested transaction. If so, the authorization response indicates that the transaction is authorized. In accordance with conventional practices, the issuer 114 transmits the authorization response to the payment system 112. At 630, the payment system 112 routes the authorization response to the acquirer computer 110 in a conventional manner.

At 632, the acquirer computer 110 sends the authorization response to the merchant 116. It will be assumed that the authorization response is positive, and that the proposed e-commerce transaction is consummated. The merchant e-commerce website may so indicate to the account holder. In addition, and as indicated at 634, the acquirer computer 110 may send a confirmation message to the data processing center/switching platform computer 108 to indicate that the transaction has been successfully completed. At 636, the data processing center/switching platform computer 108 relays the confirmation message to the account holder's MPP. At 638, the account holder's MPP provides the confirmation message to the account holder's mobile telephone 402. This may result in the account holder's mobile telephone 402 displaying a screen display like that shown in FIG. 7C.

From the point of view of the account holder, the transaction processes described above with reference to FIGS. 5, 6 and 7A-7C may be advantageous in that the account holder does not need to provide his/her payment card account number to the merchant in order to make an online purchase. Accordingly, the account holder does not need to depend on the merchant's reliability or data security measures to safeguard the account holder's payment card account number. Instead, the account number remains, with a high degree of safety, within the control of the data processing center/switching platform computer 108, the merchant's acquiring financial institution, the payment system and the account holder's account issuing financial institution. Furthermore, the mobile payments system 100 provides two-factor security against attempts to wrongfully use the account holder's mobile telephone number for a transaction. The two factors consist of the requirements both that the person requesting the transaction have possession of the account holder's mobile telephone and that the person requesting the transaction know the account holder's M-PIN.

From a system point of view, the architecture reflected in FIGS. 1 and 5 may be advantageous in that several MPPs may participate in the mobile payments system without being required to set up compatible data interfaces with each other. Rather, the MPPs only have to meet the compatibility standards for the data processing center/switching platform computer 108.

Figure 8:
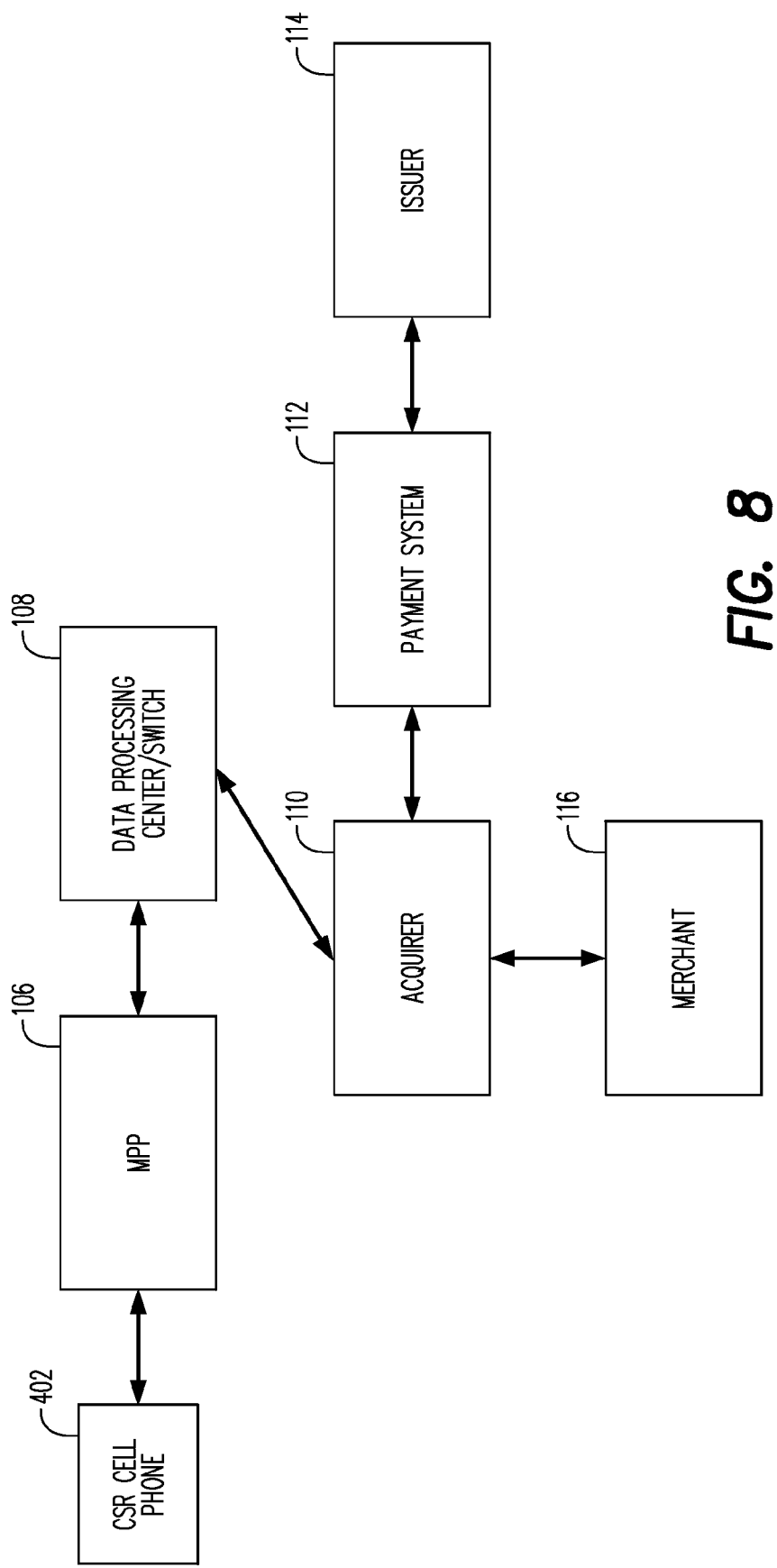
FIG. 8 is a block diagram that illustrates interactions among system participants in connection with a purchase transaction initiated from a user's mobile telephone.

FIG. 8 is a block diagram that illustrates interactions among system participants in connection with a purchase transaction initiated from an account holder's mobile telephone 402. After a brief description of the interactions with reference to FIG. 8, a more detailed description of a process for performing the transaction will be provided with reference to FIG. 9.

Referring then to FIG. 8, the purchase transaction may be initiated from the account holder's mobile telephone 402 based on information provided by a merchant. For example, the merchant may be a parking vendor operating unattended parking payment terminals, and an identification code for one of the terminals may be displayed on the terminal The terminal identification code may function as a merchant identification code. The transaction request may include the merchant identification code and may be transmitted from the account holder's mobile telephone 402 to the account holder's MPP 106. The MPP 106 may request that the account holder enter his/her M-PIN before proceeding with the requested transaction. The MPP 106 may then transmit a message to the data processing center/switching platform computer 108 to request that the data processing center/switching platform computer 108 switch the transaction to the merchant's acquirer 110. The request from the MPP 106 may include the merchant identification code, and the data processing center/switching platform computer 108 may use the merchant identification code to identify the acquirer 110 who serves the merchant in question. The request from the MPP 106 may also include the account holder's mobile telephone number, which the data processing center/switching platform computer 108 may use to look up the account holder's payment card account number. The data processing center/switching platform computer 108 then sends a request to the merchant's acquirer 110 so that the acquirer initiates a payment card system authorization request in favor of the merchant 116 and using the account holder's payment card account number. The acquirer 110 may submit the authorization request in a substantially conventional manner to the account issuer 114 via the payment system 112. The authorization response generated by the issuer 114 is routed to the acquirer 110 via the payment system 112. The acquirer sends the authorization response to the merchant 116 and also sends a confirmation message to the data processing center/switching platform computer 108. The confirmation message is relayed to the account holder's mobile telephone 402 from the data processing center/switching platform computer 108 via the account holder's MPP 106.

Figure 9:
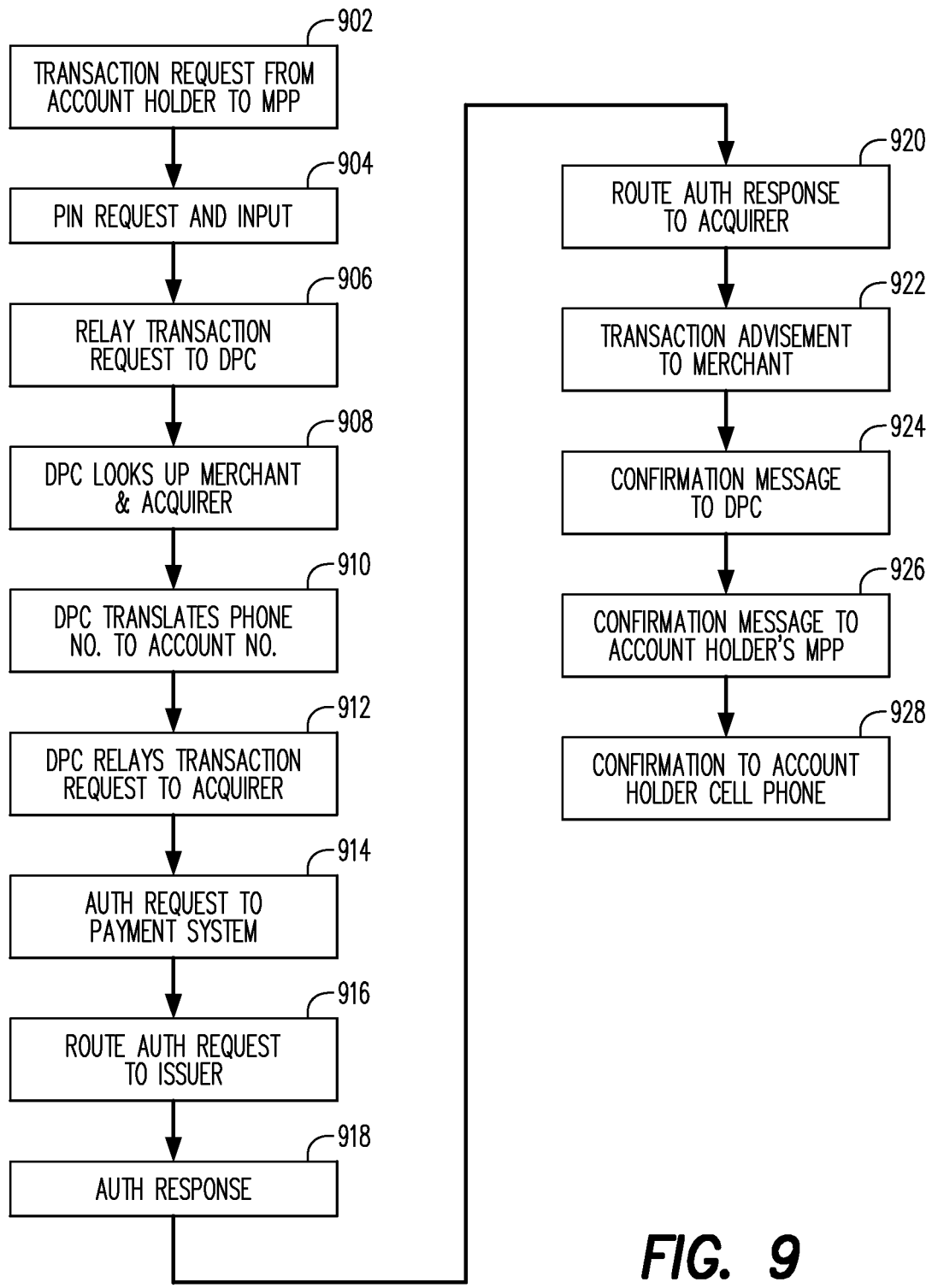
FIG. 9 is a flow chart that illustrates a process that may be performed in the system of FIG. 1 in connection with the customer-initiated purchase transaction of FIG. 8.

FIG. 9 is a flow chart that illustrates a process that may be performed in the mobile payments system 100 in accordance with aspects of the present invention to implement the purchase transaction depicted in FIG. 8.

For the example transaction to be described with reference to FIG. 9, it may be assumed that the account holder/purchaser has interacted with, or at least viewed, a merchant device (not shown) such as an unattended parking payment terminal, a ticket issuing machine, a vending machine, or the like. The merchant device or a notice posted near the merchant device may display a code that uniquely identifies the merchant device in question as well as the merchant that operates the merchant device.

At 902 in FIG. 9, the account holder operates his/her mobile telephone 402 to transmit a transaction request to the account holder's MPP 106 (and more specifically to a computer operated by or on behalf of the MPP 106). The transaction request may include the above-mentioned merchant/machine code, as well as the account holder's mobile telephone number and the amount of the transaction.

At 904 in FIG. 9, the MPP computer 106 sends a request to the account holder's mobile telephone 402 for the account holder to enter his/her M-PIN. Assuming that the account holder does so, the MPP computer 106 next, as indicated at 906, transmits the transaction request to the data processing center/switching platform computer 108. At 908, the data processing center/switching platform computer 108 accesses the merchant database 218 (FIG. 2) to identify the merchant in question as well as the merchant's acquirer 110. In addition, at 910, the data processing center/switching platform computer 108 accesses the account holder database 216, based on the account holder's mobile telephone number, to look up the account holder's payment card account number.

At 912, the data processing center/switching platform computer 108 transmits the transaction request to the merchant's acquirer (that is, to the acquirer's computer, or a computer operated on the acquirer's behalf), which the data processing center/switching platform computer 108 had identified at 908. Included in the request as transmitted by the data processing center/switching platform computer 108 are the account holder's payment card account number and data that identifies the merchant. The request may also include other information, such as a security code (e.g., a CVC2) and the expiration date for the payment card account.

The acquirer computer 110 now has the necessary information for generating and transmitting a conventional payment card system transaction authorization request. As indicated at 914, the acquirer computer 110 does so, transmitting the auth request to the payment system 112. At 916, the payment system 112 routes the authorization request in a conventional manner to the issuer 114 of the account holder's payment card account. At 918 the issuer 114 generates an authorization response in a conventional manner to indicate whether the transaction is authorized. For example, the issuer 114 may determine whether the payment card account indicated by the payment card account number included in the authorization request is in good standing and has sufficient funds or available credit to cover the requested transaction. If so, the authorization response indicates that the transaction is authorized. In accordance with conventional practices, the issuer 114 transmits the authorization response to the payment system 112. At 920 the payment system routes the authorization response to the acquirer computer 110 in a conventional manner.

At 922, the acquirer computer 110 sends a message to the merchant (e.g., to the above-mentioned merchant device) to advise the merchant that the transaction has been authorized. The transaction is then consummated. For example, the merchant device may issue a ticket, or a parking credit, or dispense an item in the case of a vending transaction.

In addition, and as indicated at 924, the acquirer computer 110 may send a confirmation message to the data processing center/switching platform computer 108 to indicate that the transaction has been successfully completed. At 926, the data processing center/switching platform computer 108 relays the confirmation message to the account holder's MPP 106. At 928, the account holder's MPP provides the confirmation message to the account holder's mobile telephone 402.

In another example transaction, the mobile payments system 100 allows the account holder to receive notice of a bill via his/her mobile telephone and to immediately accomplish payment of the bill via the mobile payments system 100. The interactions among the parties in the mobile payments system for this type of transaction may resemble the interactions as mapped in FIG. 5, assuming that the merchant 116 shown in FIG. 5 is the party rendering the bill (or a billing information aggregator that is acting on behalf of the party rendering the bill).

Figure 10:
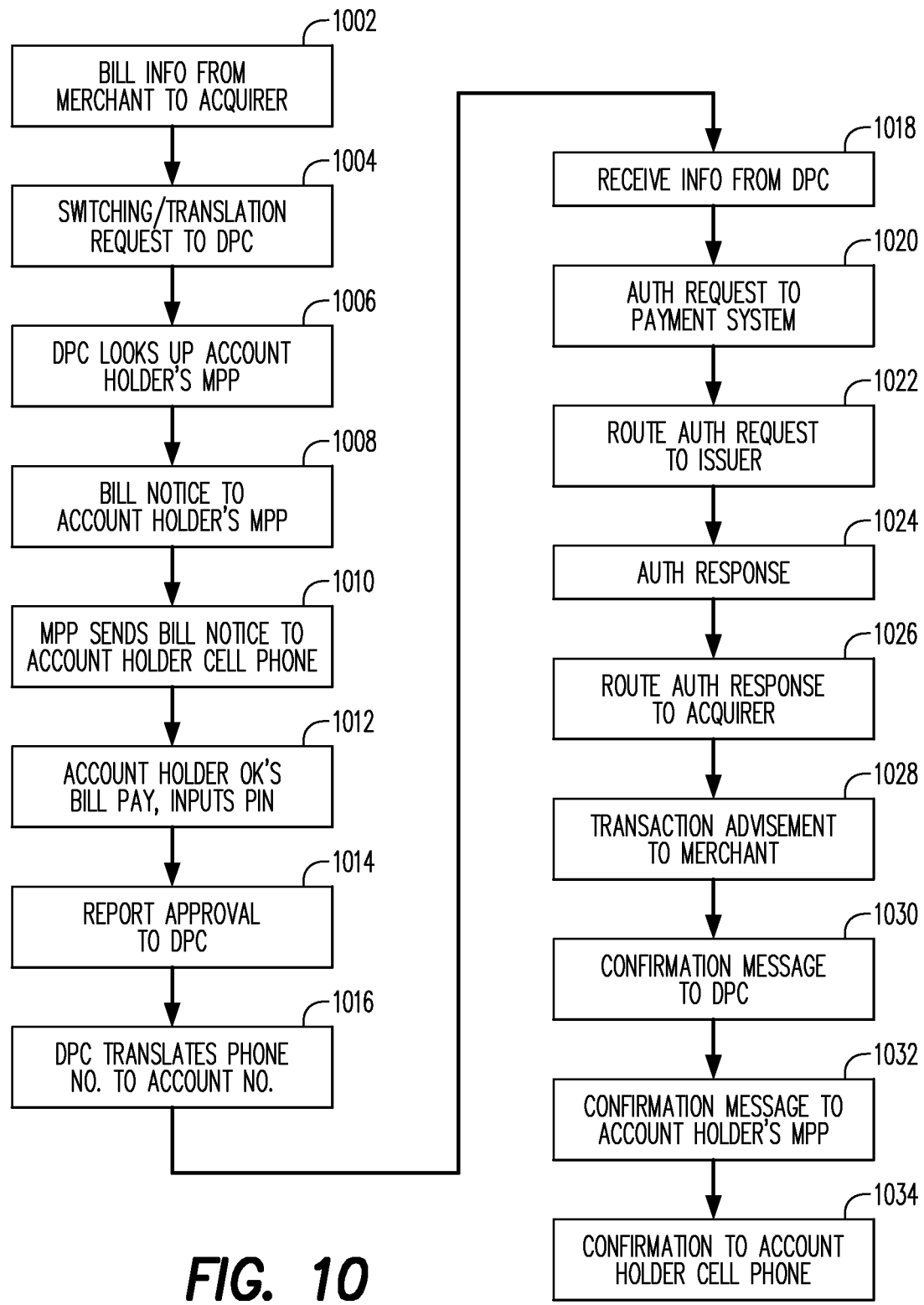
FIG. 10 is a flow chart that illustrates a process that may be performed in the system of FIG. 1 in connection with a mobile bill payment transaction.

FIG. 10 is a flow chart that illustrates a process that may be performed in the mobile payments system 100 in accordance with aspects of the present invention to carry out a bill payment transaction.

At 1002 in FIG. 10, billing information is provided from the billing organization (merchant) to the acquirer which serves the billing organization. The billing organization may, for example, be a utility company, a taxing authority, etc. The billing information may be provided directly from the billing organization or via a billing information aggregator. The acquirer may have an ongoing relationship with the billing organization for the purpose of facilitating rendering and payment of bills for the billing organization. The billing information may be provided as a batch of information that relates to numerous bills that are being rendered to individual customers by the billing organization. However, the following description of an example bill payment transaction will focus exclusively on a single bill that is being rendered to a single customer/account holder. For that customer, the bill in question takes the form of a notification to the customer that the bill is being rendered.

At 1004, the acquirer computer 110 transmits, to the data processing center/switching platform computer 108, a request that the data processing center/switching platform computer 108 switch the bill issuance notification to the MPP which serves the recipient (account holder) of the bill. In the request (as in the billing information) the recipient/account holder may be identified by his/her mobile telephone number.

At 1006, the data processing center/switching platform computer 108 uses the account holder's mobile telephone number to look up the relevant record in the account holder database 216 (FIG. 2) to determine which MPP serves the account holder. At 1008 the data processing center/switching platform computer 108 sends, to the account holder's MPP, the billing information for the bill issuance notification to be sent to the recipient/account holder.

Figure 11A:
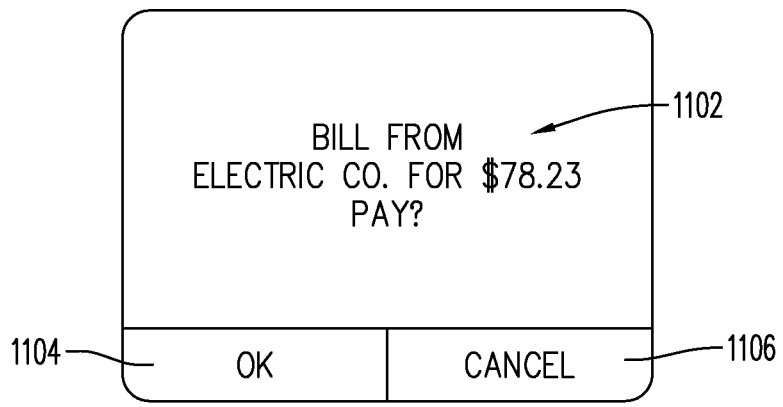
FIGS. 11A, 11B and 11C are example screen displays provided on a user's mobile telephone in connection with the mobile bill payment transaction depicted in FIG. 10.

At 1010, the computer 106 operated by or on behalf of the account holder's MPP sends a message to or otherwise communicates with the mobile telephone 402 operated by the recipient of the bill. The purpose of the message is to notify the recipient/account holder that the bill has been issued and to inquire as to whether the recipient/account holder wishes to pay the bill via the mobile payments system 100. As a result of the message from the MPP computer 106, the account holder's mobile telephone 402 may display to the account holder a screen display like that shown in FIG. 11A. Referring to FIG. 11A, reference numeral 1102 indicates the notification message as to the issuance of the bill, and an inquiry as to whether the account holder wishes to pay the bill via his/her mobile telephone. Soft key label 1104 indicates that the account holder is to actuate the left soft key (not shown) to indicate that he/she wishes to pay the bill via the mobile payments system. Soft key label 1106 indicates that the account holder is to actuate the right soft key (not shown) to decline paying the bill at this time.

Figure 11B:
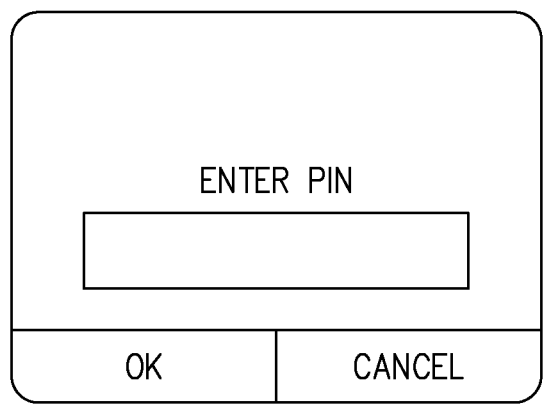

Assuming that the account holder wishes to pay the bill at this time, then block 1012 occurs. At block 1012 the account holder actuates the left soft key to indicate his/her desire to pay the bill, and the account holder mobile telephone 402 then displays a screen display such as that shown in FIG. 11B, to prompt the account holder to enter his/her M-PIN. The account holder does so, and block 1014 follows. At block 1014 the MPP computer 106 informs the data processing center/switching platform computer 108 that the bill recipient/account holder has elected to pay the bill and has been authenticated. Then, at 1016, the data processing center/switching platform computer 108 accesses the account holder database 216 (FIG. 2) using the account holder's mobile telephone number to determine the account holder's payment card account number. Block 1018 in FIG. 12 represents the acquirer computer 110 receiving the account holder's payment card account number from the data processing center/switching platform computer 108. The same message from the data processing center/switching platform computer 108 to the acquirer computer 110 may also include additional information, such as a security code and the payment card account expiration date.

The acquirer computer 110 may now proceed (block 1020, FIG. 10) to generate and transmit (to the payment system 112) a substantially conventional transaction authorization request, in favor of the entity that rendered the bill. That is, the acquirer computer 110 may now perform the functions of a payment system acquirer for the entity that rendered the bill.

At 1022, the payment system 112 routes the authorization request in a conventional manner to the issuer 114 of the account holder's payment card account. At 1024, the issuer 114 generates an authorization response in a conventional manner. At 1026, the payment system 112 routes the authorization response from the issuer 114 to the acquirer computer 110.

Assuming the authorization response indicates authorization for the bill payment transaction, then at 1028 the acquirer computer 110 sends a message to the entity that rendered the bill to indicate that the bill has been paid by the account holder via the mobile payments system 100.

Figure 11C:
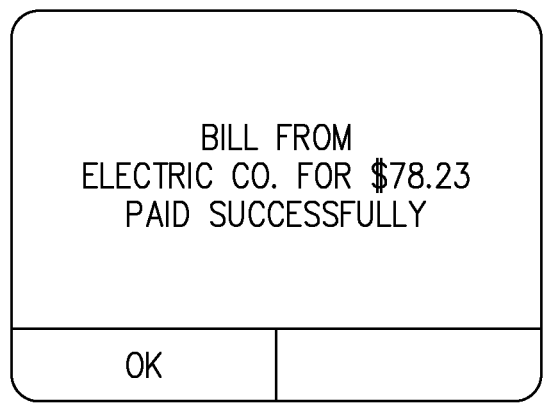

At 1030 in FIG. 10, the acquirer computer 110 may send a confirmation message to the data processing center/switching platform computer 108 to indicate that the bill payment transaction has been performed successfully. At 1032, the data processing center/switching platform computer 108 relays the confirmation message to the account holder's MPP. At 1034, the account holder's MPP provides the confirmation message to the account holder's mobile telephone 402. In response to this message, the account holder's mobile telephone 402 may then display a screen display like that shown in FIG. 11C.

In some embodiments, even though a bill recipient/account holder declines to pay the bill at the time that his/her mobile telephone receives the notification (and/or the bill recipient/account holder or the mobile telephone is not available when the bill notification is sent), the billing information may still be stored in the mobile telephone and the bill recipient/account holder may decide at a later time to pay the bill via his/her mobile telephone and the mobile payments system 100. To do so, the account holder may select a bill payment function from a menu displayed by the mobile telephone and then may select a previously stored bill for payment. Next the account holder may select an option to send a message to the account holder's MPP to indicate that the account holder wishes to pay the bill in question. At that point, the MPP may send a message back to the mobile telephone requiring the account holder to confirm the desired bill payment and to enter his/her M-PIN. (Alternatively, entry of the M-PIN may occur prior to the mobile telephone sending the message to the MPP, and the message may include the M-PIN.)

From this point on the bill payment transaction may be handled similarly to steps 1014-1034 in FIG. 10. The message from the mobile telephone to the account holder's MPP may include information that indicates the identity of the billing company's acquirer.

The transaction process illustrated in FIG. 6 may also be adapted to operate to handle payment in an in-person purchase transaction. For example, the purchaser/account holder's mobile phone number may be input by the merchant into a POS terminal, which then requests payment via a transaction in the mobile payments system 100. For example, the POS terminal may submit a transaction request to the acquirer 110 per block 604 in FIG. 6.

In some embodiments, the mobile payments system 100 may support transactions for topping up mobile telephone service accounts. For example, in such a transaction the account holder may select a "mobile top up" function offered as a menu option via the user interface on his/her mobile telephone. In response to prompts from the mobile telephone, the account holder may input into the mobile telephone the telephone number for the account to be topped up and the amount of the top up transaction. The mobile telephone then sends a message to the account holder's MPP to indicate the desired top up transaction. The message may also include the M-PIN, which the mobile telephone had also prompted the account holder to enter. The account holder's MPP may verify that the M-PIN is correct, and next may request the data processing center/switching platform computer to provide the account holder's payment card account number and other related information. Upon receiving this information from the data processing center/switching platform computer, the MPP, now acting as an acquirer, submits an authorization request via the payment system. The payment system routes the authorization request to the issuer of the account holder's payment card account. The issuer charges the payment card account and generates an authorization response. The payment system routes the authorization response to the MPP/acquirer. The MPP/acquirer notifies the account holder's MNO of the top up transaction and also confirms to the account holder that the top up has occurred. The MNO recharges the mobile service account in question.

In still other embodiments, such a transaction may be initiated by the MNO sending a suitable notice/inquiry to the account holder to ask whether the account holder wishes to top up his/her mobile service account.

In other embodiments, the mobile payments system 100 may support person-to-person remittance transactions. For example, the account holder may initiate such a transaction by selecting the corresponding function provided as a menu option by the user interface in his/her mobile telephone. The mobile telephone may prompt the account holder to enter the amount of the remittance and the mobile telephone number of the recipient of the remittance. In some embodiments, the account holder may be required to input the recipient telephone number twice to prevent input errors in identifying the recipient. The mobile telephone then sends a message to the account holder's MPP to indicate the desired remittance transaction. The MPP may respond by sending a message to the account holder's mobile telephone to indicate a fee that will be charged for the transaction. The account holder may operate his/her mobile telephone to indicate acceptance of the fee and to input his/her M-PIN. The account holder's MPP may verify that the M-PIN is correct, and next may request the data processing center/switching platform computer to provide the account holder's payment card account number and other related information. Upon receiving this information from the data processing center/switching platform computer, the MPP, now acting as an acquirer, submits an authorization request via the payment system. The payment system routes the authorization request to the issuer of the account holder's payment card account. The issuer charges the payment card account and generates an authorization response. The payment system routes the authorization response to the MPP/acquirer. Next the MPP requests the data processing center/switching platform computer to arrange for the recipient's approval for the remittance transaction. In doing so, the MPP provides the recipient's mobile telephone number to the data processing center/switching platform computer. The data processing center/switching platform computer determines the identity of the recipient's MPP and requests that the recipient's MPP obtain the recipient's approval. The recipient's MPP then sends a message to the recipient's mobile telephone requesting approval from the recipient and entry of the recipient's M-PIN. The recipient operates his/her mobile telephone to indicate approval and to enter his/her M-PIN and the recipient's MPP verifies the recipient's M-PIN. Then the recipient's MPP informs the data processing center/switching platform computer that the recipient has approved the remittance transaction. The data processing center/switching platform computer translates the recipient's mobile telephone number into the recipient's payment card account number and sends the recipient's payment card account number and related information to the remittance sender's MPP, which will now act as acquirer for the second leg of the remittance. The sender's MPP sends an authorization request for the transfer to the recipient's account to the recipient's payment card account issuer via the payment system. The recipient's account issuer credits the remittance amount to the recipient's account and sends an authorization response to the sender's MPP via the payment system. The sender's MPP sends a confirmation message to the remittance sender's mobile telephone to indicate successful performance of the remittance transaction. In addition, the sender's MPP sends a confirmation message to the data processing center/switching platform computer, to be relayed to the recipient's mobile telephone. The latter confirmation message is thus sent from the data processing center/switching platform computer to the recipient's MPP and from the recipient's MPP to the recipient's mobile telephone.

In some embodiments, when the data processing center/switching platform computer receives a request from the acquirer, the data processing center/switching platform computer looks up the account holder's payment card account number before requesting that the account holder's MPP obtain approval for the transactions and authentication from the account holder.

Some FIs that participate in the mobile payments system may do so in more than one role. For example, some acquirers may also function as MPPs. To do so, in some embodiments, the FI in question may operate one computer to perform MPP functions and another computer to perform acquirer functions. In other embodiments, the functions of the two computers referred to in the previous sentence may be performed by one computer. In some embodiments, when an acquirer is also an MPP, the acquirer and/or MPP computer may perform a function to determine whether the account holder for a proposed transaction is served by the FI as an MPP. In such cases, the transaction may be switched internally in the FI from its acquirer function to its MPP function to obtain account holder approval and authentication without assistance from the data processing center/switching platform computer. However, even in these cases the acquirer may request the data processing center/switching platform computer to perform translation of the account holder's mobile telephone number into the account holder's payment card account number.

It may also be the case that an FI which serves as an acquirer also functions as an issuer of payment card accounts. Further, in some embodiments, an MNO may serve as an MPP. Other combined roles are also possible in various embodiments of the mobile payments system.

In some embodiments, clearing of all payment system transactions described herein may be in accordance with conventional practices.

In some embodiments an identifier for the account holder's SIM card may be used instead of or in addition to the account holder's mobile telephone number for purposes of identifying and/or indexing the account holder with respect to one or more participants in the mobile payments system.

The above depictions and descriptions of processes herein are not intended to imply a fixed order of performing the process steps. Rather, the process steps may be performed in any order that is practicable.

As used herein and in the appended claims, the term "transaction amount" refers to a dollar or other currency amount of a purchase transaction.

It should be noted that the block 108 as depicted in some of the drawings represents both the data processing center/switching platform computer illustrated in FIG. 2 and the entity which operates the computer. In some embodiments, that entity may be a payment card association (such as MasterCard International Inc., which is the assignee hereof) or a contractor retained by the payment card association.

Any one or more of the computers referred to herein may be a server computer.

The term "computer" as used herein and in the appended claims includes two or more computers that cooperate with each other, as well as a single computer.

The term "processor" as used herein and in the appended claims includes two or more processors that cooperate with each other, as well as a single processor.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
    receiving, by a data processing center (DPC) computer from an acquirer computer, billing information and a bill issuance notification request, the billing information including a mobile telephone number;
    determining, by the DPC computer based on the mobile telephone number, a mobile payment platform (MPP) computer that is operated by or on behalf of a service provider having an account holder as a customer;
    transmitting, by the DPC computer to the MPP computer, the billing information for relaying a billing issuance notification to a mobile device of the account holder;
    receiving, by the DPC computer from the MPP computer, an information message indicating that the account holder has been authenticated and has elected to pay the bill associated with the billing issuance notification and comprising account security data;

determining, by the DPC computer based on the mobile telephone number, a payment card account number of the account holder;

generating, by the DPC computer, a transaction message comprising the payment card account number and the account security data; and transmitting, by the DPC to the acquirer computer, the transaction message for bill payment processing.

2. The method of claim 1, wherein the account security data comprises at least one of a security code of the account holder's payment card account number and a payment card account expiration data.

3. The method of claim 1, further comprising receiving, by the DPC computer from the acquirer computer, a confirmation message indicating that the bill payment transaction has been successfully performed.

4. The method of claim 3, further comprising transmitting, by the DPC computer to the MPP computer, the confirmation message for transmission to the account holder's mobile device.

5. An apparatus, comprising:
a processor; and
a memory operably connected to the processor, the memory storing instructions configured to cause the processor to:
receive billing information and a bill issuance notification request from an acquirer computer, the billing information including a mobile telephone number;
determine based on the mobile telephone number, a mobile payment platform (MPP) computer that is operated by or on behalf of a service provider having an account holder as a customer;
transmit the billing information to the MPP computer for relaying a billing issuance notification to a mobile device of the account holder;
receive an information message from the MPP computer indicating that the account holder has been authenticated and has elected to pay the bill associated with the billing issuance notification and comprising account security data;
determine, based on the mobile telephone number, a payment card account number of the account holder;
generate a transaction message comprising the payment card account number and the account security data; and
transmit the transaction message to the acquirer computer for bill payment processing.

6. The apparatus of claim 5, wherein the instructions for receiving the information message comprising the account security data from the MPP computer further comprises instructions configured to cause the processor to receive account security data comprising at least one of a security code of the account holder's payment card account number and a payment card account expiration data.

7. The apparatus of claim 5, further comprising instructions configured to cause the processor to receive a confirmation message from the acquirer computer indicating that the bill payment transaction has been successfully performed.

8. The apparatus of claim 7, further comprising instructions configured to cause the processor to transmit the confirmation message to the MPP computer for transmission to the account holder's mobile device.

* * * * *